(12) United States Patent
Kikitsu et al.

(10) Patent No.: US 6,240,060 B1
(45) Date of Patent: May 29, 2001

(54) PHASE CHANGE OPTICAL RECORDING MEDIUM

(75) Inventors: Akira Kikitsu, Kanagawa-ken; Sumio Ashida, Tokyo; Keiichiro Yusu; Katsutaro Ichihara, both of Kanagawa-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/395,573

(22) Filed: Sep. 14, 1999

(30) Foreign Application Priority Data

Sep. 14, 1998 (JP) .................................................. 10-260575

(51) Int. Cl.$^7$ ...................................................... G11B 7/24
(52) U.S. Cl. .................. 369/275.1; 430/270.13; 428/64.4
(58) Field of Search ........................... 369/275.1, 275.2, 369/275.5, 280, 288; 430/270.13, 320, 321; 428/64.4, 64.1

(56) References Cited

U.S. PATENT DOCUMENTS

| | | | |
|---|---|---|---|
| 5,270,149 | * 12/1993 | Iselborn et al. | 430/270.13 |
| 5,305,303 | * 4/1994 | Akahira et al. | 369/275.4 |
| 5,650,992 | * 7/1997 | Ohkubo | 369/275.1 |
| 5,811,217 | * 9/1998 | Akahira et al. | 430/270.13 |
| 5,812,182 | * 9/1998 | Kawai | 347/262 |
| 5,889,756 | * 3/1999 | Ichihara et al. | 369/275.2 |
| 5,900,347 | * 5/1999 | Ohkubo | 430/270.13 |
| 5,978,349 | * 11/1999 | Yoshinari et al. | 369/275.1 |
| 6,042,921 | * 3/2000 | Yoshinari et al. | 369/275.1 |
| 6,071,587 | * 6/2000 | Yoshinari et al. | 428/64.1 |

FOREIGN PATENT DOCUMENTS 7-210897   8/1995   (JP) .

\* cited by examiner

*Primary Examiner*—Tan Dinh
(74) *Attorney, Agent, or Firm*—Finnegan, Henderson, Farabow, Garrett & Dunner, L.L.P.

(57) ABSTRACT

A phase change recording medium comprises a substrate, an interference layer formed on the substrate and a recording layer formed on the interference layer. In this, the reflectance of the crystalline region in the recording layer is lower than that of amorphous region therein, and the interference layer comprises at least three layers of which the dielectric constant differs from that of the adjacent layers. With that constitution, the optical characteristics and the thermal characteristics of the medium are all optimized.

17 Claims, 2 Drawing Sheets

PHASE CHANGE OPTICAL RECORDING MEDIUM

BACKGROUND OF THE INVENTION

1. Field of the Invention

The present invention relates to phase change optical recording medium. More concretely, it relates to advanced phase change optical recording medium which have good optical characteristics and good thermal characteristics and of which the absorbance in both the crystalline site and the amorphous site is optimized to reduce cross-erasure and phase jittering in the position of the recorded marks in the medium.

2. Description of the Related Art

Phase change optical recording medium in which information data are recorded and reproduced with optical beams applied thereto have the advantages of large memory capacity, rapid access performance and mobility. In addition, as compared with magneto-optical recording medium, they are further advantageous in that inexpensive CD-compatible drives for them are easy to fabricate since they are based on the same reproduction principle of reflectance change as that for CDs (compact discs), that their memory density is easy to increase since their signal-to-noise ratio is high, and that their data transfer rate is high since one-beam overwriting on them is easy.

An optical disc, which is one example of optical recording medium, is described below.

The operation principle for phase change optical discs is as follows: The recording layer in the disc is melted through exposure to light with the recording power level, and then cooled within a period of time shorter than the crystallization time for the layer to thereby form amorphous marks recorded thereon. The recorded layer is exposed to light with the erasing power level, whereby the layer is heated at a temperature lower than its melting point but not lower than its crystallization point, for which the heating time is kept longer than the crystallization time for the layer. In that manner, the layer is crystallized and the information data recorded thereon are erased. Not depending on the state of the recording layer as to whether the layer is amorphous or crystalline, information data may be written on the layer and the data written thereon may be erased. Therefore, one-beam overwriting on the layer is possible. Reproducing the data written on the layer is based on the difference in the reflectance between the crystalline state and the amorphous state of the layer.

The recording layer may be a thin film of a chalcogenide metal compound, such as GeSbTe. AgInSbTe or InSbTe to which a minor component of Cr, V, N or the like maybe added. Regarding its shape, the disc is typically composed of a polycarbonate substrate with preformatted address and data regions, and a lower dielectric layer, a recording layer, an upper dielectric layer and a reflective layer as laminated on the substrate in that order. An opposite substrate or a label is stuck onto the reflective layer via an adhesive layer therebetween. The dielectric layers and the reflective layer are to prevent the recording layer from being oxidized, to prevent it from being degraded by cumulative overwriting thereon, to modulate the thermal response in recording on the recording layer, and to enhance the optical characteristics of the recording layer in reproducing the data recorded on the layer. In particular, regarding the optical enhancement effect of those layers, the lower dielectric layer exhibits a multi-beam interference effect between the substrate and the recording layer and the upper dielectric layer exhibits a multi-beam interference between the recording layer and the reflective layer, thereby increasing the reflectance change in the recording layer to improve the signal-to-noise ratio of the disc.

In the disc, the reflectance of the amorphous marks (Ra) could be defined freely to be higher or lower than the reflectance of the crystalline area (Rc), depending on the thickness of each layer. Similarly, the absorbance of the amorphous marks (Aa) could also be defined freely to be higher or lower than the absorbance of the crystalline area (Ac).

In recent high-density optical discs with land/groove recording scheme, the recording track-to-track distance is narrowed. In those, one laser ray directed to one track will often spread over the adjacent track regions, and while information data are written or read on one track, other information data written on the adjacent tracks are often erased. The problem of cross-erasure is serious in the discs.

Information data are written as amorphous marks in discs. Therefore, to prevent cross-erasure in discs, the amount of thermal absorption from laser rays in the amorphous marks in adjacent tracks must be lowered. For this, it is desirable that Ac/Aa is at least 1, preferably at least 1.4 or so. Moreover, when Ac/Aa>1, the film temperature at which the film is melted could be similar in the crystalline area and the amorphous area in consideration of the lateral heat for melting, or that is, the overwriting jitter could be reduced (absorbance adjustment).

Regarding the medium constitution that satisfies the requirement of Ac/Aa>1, a structure of substrate/ZnS—SiO2/SiO2/ZnS—SiO2/GeSbTe/ZnS—SiO2/reflective alloy layer was reported orally at Optical Data Storage 98 (Report No. WB3-3), saying that Ac/Aa in the structure is about 1.5.

In the medium reported, however, Rc was defined higher than Ra. Therefore, the medium has some problems mentioned below. In the structure of the medium reported, a thick, heat-insulating dielectric layer is sandwiched between the recording layer and the substrate. In other words, only a so-called slowly-cooling structure could be selected for the medium. Therefore, it is difficult to attain thermal design with Rc higher than Ra for realizing suitable recording/erasure/cross-talk reduction characteristics.

In many phase change optical recording medium heretofore known in the art, Rc is defined higher than Ra. In fabricating those many phase change optical recording medium, after films are formed or after they are laminated, they are subjected to initial crystallization process whereby the recording layer is crystallized throughout the entire surface of the disc. In those, the recording layer not subjected to initial crystallization process is "as deposited", or that is, it is in an amorphous state just as it has been deposited. After having been subjected to initial crystallization, the medium with Rc higher than Ra have high reflectance before being recorded thereon. After recorded, they give signals in the downward direction (that is, in the direction in which their reflectance decreases). Therefore, they are referred to as high-to-low (H-to-L) medium. Their reflectance is increased through initial crystallization, and H-to-L medium have advantages that their address and data regions have high reflectance in the initial stage and provide good servo signal. However, as they have high Rc, their Ac could not be increased so much. Accordingly, H-to-L medium have many problems in that their recording sensitivity is low, the absorbance adjustment indispensable for mark length recording is difficult, and their production costs are high as they indispensably require initialization process.

In particular, when the H-to-L medium with Rc>Ra have no light-absorbing layer except the recording layer, and have a complete reflection-type film structure, they shall naturally have Ac>Aa, and it is impossible to solve absorbance adjustment problem. Some attempt for absorbance adjustment for H-to-L medium with Rc>Ra have been reported. For example, employing an ultra-thin reflective layer as a semi-transparent layer; or a light-absorbing layer is provided between the recording layer and the reflective layer. With those methods, however, the medium modified could have Ac over Aa value by at most 1.2 or so, and they are still unsuitable to higher linear velocity operation for which further absorbance adjustment is needed.

On the other hand, medium of which the film structure with Rc lower than Ra have the advantages of high recording sensitivity and easy absorbance adjustment. In particular, five-layered medium that have a semi-transparent layer of a thin metal film between the substrate and the lower dielectric layer of the four-layered media noted above are suitable to high linear velocity operation, since they can be designed to have Ac>Aa by at least 1.5 by appropriate thickness of the upper and lower interference films and since their crystalline region has high recording sensitivity.

However, with Ac/Aa being higher and with reproduction CNR being higher, Rc of the medium of that type shall be lowered more. Therefore, the medium with Rc<Ra are also problematic, in that their address region becomes difficult to read after initial crystallization process, which is used an the case of the media with Rc>Ra noted above, and the servo signals in the data region are also difficult to read before recording process. In addition, in designating the medium structure with Ac/Aa of around 1.5, the thermal design for realizing the suitable recording/erasure/cross-talk reduction characteristics noted above is difficult, as the latitude in the medium structure is narrow.

SUMMARY OF THE INVENTION

The object of the present invention is to solve the problem of difficulties in realizing phase change optical recording medium with Ac/Aa, which is necessary to reduce cross-talk, >1, and in realizing both good optical design and good thermal design in fabricating those medium.

The first aspect of the invention is to provide a phase change optical recording medium, which comprises a substrate, an interference layer formed on the substrate and a recording layer formed on the interference layer, and is characterized in that the reflectance of the crystalline region in the recording layer as seen from the light detection side is lower than the reflectance of the amorphous region in the recording layer, and that the interference layer comprises a first layer, a second layer which is below the first layer and of which the dielectric constant differs from that of the first layer, and a third layer which is below the second layer and of which the dielectric constant differs from that of the second layer.

In the first aspect of the invention, the first, second and third layers constituting the interference layer may be of any materials so far as the adjacent layers differ from each other in their dielectric constant. For example, they may be made of dielectric substances, semiconductors, metals or any other materials. The dielectric constant is a physical constant including the refractive index, n, and the extinction coefficient, k. Of those, only the refractive index, n, may differ between the adjacent layers, or only the extinction coefficient, k, may differ therebetween, or both the refractive index, n, and the extinction coefficient, k, may differ therebetween. Concretely, it is desirable that n and/or k differ therebetween by at least 0.01, more preferably by at lest 0.1.

As the case may be, the first and third layers may be of the same material. For a recording layer of GeSbTe, ZnS—SiO2 may be preferred as the layers that sandwich the recording layer therebetween. In that case, it is desirable that the first layer adjacent to the recording layer is of ZnS—SiO2. In the case, the second layer may be any one of which the dielectric constant differs from that of the first layer. The material of ZnS—SiO2 has a relatively large refractive index, n. Therefore, for the second layer, preferred is a material of which the refractive index, n, is smaller than that of ZnS—SiO2, as the latitude in material selection and the margin in optical design could be broadened. Also desirably, the second layer may be of SiO2, since the materials will be mixed little in the interface between the first and second layers.

The interference layer between the recording layer and the substrate may well be composed of at least the first, second and third layers as above each differing from the adjacent layers in the dielectric constant, and may optionally have any additional fourth, fifth and sixth layers for further improving their optical characteristics. However, stacking too many layers is unfavorable, as taking a lot of time for processing them.

The second aspect of the invention is to provide a phase change optical recording medium, which comprises a substrate, an interference layer formed on the substrate and a recording layer formed on the interference layer, and is characterized in that the interference layer comprises a first layer, a second layer which is below the first layer, a third layer which is below the second layer, and a metal layer which is adjacent to at least any of the first to third layers, and that the dielectric constant of the first to third layers and the metal layer that constitute the interference layer differs from that of the adjacent layers.

In the second aspect of the invention, the recording layer is preferably so modulated that the reflectance of the crystalline region therein as seen from the light detection side is lower than the reflectance of the amorphous region therein.

In the second aspect, the first, second and third layers constituting the interference layer may be the same as those in the first aspect as above.

The material for the metal layer may be any and every one employable in ordinary recording medium, so far as it satisfies the optical characteristics desired herein. It includes, for example, Au and its alloys, Al and its alloys. Especially preferred is Au, as easily satisfying the requirement of Ac/Aa. In particular, the interference layer with its metal layer of Au is preferred, as its effect is augmented by the other first, second and third layers to satisfy the requirement of Ac/Aa>1 with ease. Regarding the difference in the dielectric constant between the metal layer and the first to third layer, it is desirable that the difference in the extinction coefficient between them is at least 0.1.

The positional relationship between the first layer, the second layer, the third layer and the metal layer constituting the interference layer is not specifically defined, and those layers may be appropriately positioned relative to each other, depending on the requirements of optical design and thermal design for the medium. For example, the interference layer may have any constitution of metal layer/first layer/second layer/third layer; first layer/metal layer/secondlayer/thirdlayer; firstlayer/secondlayer/metal layer/ third layer; or first layer/second layer/third layer/metal layer. The same shall apply to the other constitutions of the interference layer that may optionally have additional fourth, fifth and sixth layers.

In the first and second aspects of the invention, the recording layer has the data region and the address region, the data region has a plurality of tracks. Each track has the crystal band after an erasing operation is carried out and has the amorphous mark lines after a recording operation is carried out.

In the first and second aspects of the invention, one preferred embodiment of the recorded state of the medium is such that the crystal bands therein are narrower than the track width and have therein amorphous mark lines of which the width is the same as or narrower than the width of the crystal bands. In that embodiment where the width of the crystal bands is the same as that of the amorphous marks, the edges of the amorphous marks are connected with the amorphous bands existing between the crystal bands. In that case, the mark width of the amorphous mark lines is difficult to define. In the invention, the mark width of the amorphous mark lines in the embodiment where the amorphous mark lines are connected with the amorphous bands is defined to be the same as the width of the crystal bands.

In the first and second aspect of the invention, it is desirable that the address region in the recording layer is amorphous.

Hereinunder described are the means for realizing the embodiment of the recorded state of the medium where the crystal bands therein are narrower than the track width and have therein amorphous mark lines of which the width is the same as or narrower than the width of the crystal bands, and for realizing the embodiment of the medium where the address region in the recording layer is amorphous.

Concretely, the first method for those embodiments comprises making the amorphous state of the recording layer just after its formation through sputtering process similar to the amorphous state of the same layer to be formed in optical recording operation, so as to attain recording/reproducing operation with no initial crystallization process of the recording layer; the second method comprises initializing process which is applied to only the data region in the recording layer with optical beams of which the profile differs from that of the optical beams for ordinary initial crystallization; and the third method comprises using the initial crystallization process of the recording layer in a mode of melting initialization.

The recording layer used for phase change recording is generally formed through sputtering process, and has an amorphous state just after having been formed. The technique of sputtering is to form a desired film on a substrate by applying high-energy Ar ion beams onto the surface of a target to release sputtered particles (in a vapor phase) from the target surface. In this, the sputtered particles reach the substrate with random direction, then also randomly migrate (in a liquid phase) on the surface of the substrate, and solidified thereon to be into a film of a solid phase. The transfer temperature at which the sputtered particles of being in a vapor phase are solidified in a solid phase on the substrate is generally $10^{12}$ K/sec or so. In other words, it may be presumed that the time necessary for converting the random particles in a vapor phase at several eV (tens thousands K) into solidified particles in a solid phase at room temperature will be 10 nanoseconds or so, and that the time necessary for the particles to pass through the temperature zone between the melting point and the crystallization point (crystallization retention time) will be at most 1 nanosecond or so.

On the other hand, the crystallization time for recording layers of GeSbTe or InSbTe are several tens nanoseconds. For crystallizing the films of those layers, the crystallization time for the films shall be shorter than the crystallization retention time noted above. Therefore, the recording layer just having been formed through sputtering as above has an amorphous state. In general, the amorphous state of the recording layer just after having been formed differs from the amorphous state of the layer having been optically recorded thereon. The reason is because the cooling rate in optical recording is typically $10^{10}$ K/sec or so, though depending on the linear velocity for recording and the structure of the medium being recorded, or that is, the cooling rate in optical recording is around 100 times lower than the phase-transfer rate in sputtering.

If the amorphous state of the recording layer just after having been formed through sputtering process is the same as that of the same layer having been optically recorded, the medium comprising the recording layer of that type could be operated for recording/reproducing with no initial crystallization process. In fact, however, the amorphous state of the recording layer just after having been formed through sputtering process differs from that of the same layer having been optically recorded, owing to the difference in the cooling rate in the sputtering process and in the recording process. For these reasons, therefore, any medium with Rc>Ra and those with Rc<Ra could not be directly recorded thereon with no initial crystallization process.

According to the first method for the phase change optical recording medium with Rc<Ra of the invention, the medium could be directly recorded thereon without being subjected to initial crystallization process.

One concrete means for the first method comprises sputtering the target particles for a film to be the recording layer, with the cooling rate for the sputtered particles being so lowered that the amorphous state of the recording layer just after its formation through sputtering process is made similar to the amorphous state thereof to be formed in optical recording operation; and the other comprises applying compressive stress to the recording layer formed just after the sputtering process to thereby make the recording layer easily crystallizable. The two may be combined, if desired.

For making the amorphous state of the recording layer just after its formation through sputtering process similar to the amorphous state thereof to be formed in optical recording operation, the energy of the particles being sputtered toward the substrate is lowered, or the time for which the sputtered particles migrate on the surface of the substrate is controlled long. More concretely, for this, it is effective to use, as the sputtering gas, Kr, Xe or a mixed gas of the two, of which the effect to cool sputtered particles of GeSbTe is more remarkable than that of ordinary sputtering gas of Ar, or to apply small bias power to the substrate to thereby promote the migration of the sputtered particles on the surface of the substrate.

In the medium thus formed in the manner noted above, the recording layer just after its formation through sputtering process could have an amorphous state similar to the amorphous state of the layer to be formed in optical recording operation. When amorphous marks are recorded on the medium, the mark-to-mark area in the recorded layer is crystallized with the result that the amorphous marks formed could be positioned partially in the crystal bands of which the width is narrower than the track width. The width of the amorphous marks is narrower than or the same as that of the crystal bands. In the latter case where the width of the amorphous marks is the same as that of the crystal bands, the amorphous marks will be connected with the amorphous bands existing between the adjacent crystal bands. When the edges of the amorphous marks are crystallized at a low linear velocity, then crystal bands of which the width is narrower in some degree than the track width will be formed. In that case, the amorphous marks, of which the width is narrower in some degree than that of the crystal bands, shall exist in the crystal bands. The amorphous bands formed in the region between the adjacent crystal bands still maintain the amorphous state of the recording layer just after its formation through sputtering process.

For imparting compressive stress to the recording layer just after its formation through sputtering process to thereby facilitate the crystallization of the layer, effectively employed is a method of increasing the compressive stress of the recording layer, or a method of applying compressive stress to the interference layers as disposed above and below the recording layer to thereby make the recording layer easily compressive. The recording layer has a smaller volume when it is in a crystalline state than in an amorphous state. Therefore, the volume of the recording layer to which compressive stress has been applied is easier to decrease, or that is, the recording layer is more readily crystallized. In forming a film on a substrate through sputtering process, in general, high-energy particles may be sputtered toward the substrate. In that case, therefore, it is easy to impart compressive strain to the film thus formed through sputtering process. Concretely, in the invention, it is effective to lower the sputtering gas pressure in forming the recording layer or forming the upper and lower interference layers, thereby increasing the energy of the particles being sputtered onto the substrate, or to apply bias power to the substrate thereby accelerating the ions of the sputtering gas so as to further increase the particles being sputtered onto the substrate.

Of the methods noted above, the former where the sputtering gas pressure in forming the recording layer is lowered may be contradictory to the first case for the first method mentioned previously where the energy of the sputtering particles is lowered. However, the condition for lowering the rate of cooling the sputtered particles on the substrate to thereby impart suitable compressive stress to the recording layer formed is favorable to the medium of the present invention, and it shall be optimized in relation to the other means for fabricating the medium of the invention. The most preferred method comprises forming the recording layer through high-pressure sputtering with a heavy rare gas (this is favorable for applying bias power to the substrate and for simultaneously applying compressive stress to the recording layer formed), and forming the upper and lower interference layers through low-pressure bias sputtering to thereby apply large compressive stress to the layers.

The second method for fabricating the phase change optical recording medium of the invention comprises locally initializing only the data region in the recording layer. In ordinary initial crystallization process, used are beams in a long oval form that covers several hundreds tracks, with which the address region and the data region in the recording layer are initialized all at a time. Being different from this, in the invention, used are beams in a circular form with a diameter of submicrons at a Full-Width-at-Half-Maxima (FWHM), like those for practical CD drives. In the invention, therefore, the address region is not subjected to initial crystallization process with those beams, but only the area around the center of each track in the data region is crystallized. In that manner, formed are crystal bands of which the width is narrower than the track width. The region between the adjacent crystal bands is left still amorphous as in the recording layer just after its formation through sputtering process. When amorphous marks are recorded on the recording layer in that state, thereon formed are amorphous marks of which the width is narrower than or the same as the width of the crystal bands. In repeating overwriting, the amorphous region between the adjacent crystal bands which is in the initial amorphous state of the recording layer just after its formation through sputtering process will be changed to the amorphous state as formed in optical recording operation, but, at a low linear velocity for recording, it will be crystallized owing to the crystallizing effect of the area around the amorphous marks. The bands thus formed through the crystallization are also the crystal bands referred to herein.

The third method for fabricating the phase change optical recording medium of the invention comprises initial crystallization process for which are used beams with a long oval form as used in the ordinary initialization process. For the melting initialization in this, however, the initialization power is increased, or the linear velocity for initial crystallization process is lowered, or the feed pitch of the beams for initial crystallization process in the radial direction of the disc is narrowed. In that manner, the third method realizes the amorphous state of the recording layer both in the address region and the data region thereof, which is the same as the amorphous state of the layer to be formed in optical recording operation, like the first method that does not require initial crystallization process. The third method does not require any specific sputtering means, also like the first method. After having been recorded thereon, the state of the recording layer formed in the third method is the same as that of the recording layer formed in the first method. According to the third method, therefore, fabricated are the phase change optical recording medium of the invention.

DETAILED DESCRIPTION OF THE INVENTION

The invention is described in more detail with reference to the following Examples.

The following Examples are to demonstrate optical discs, as one embodiment of the phase change optical recording medium of the invention.

EXAMPLE 1

Figure 1:
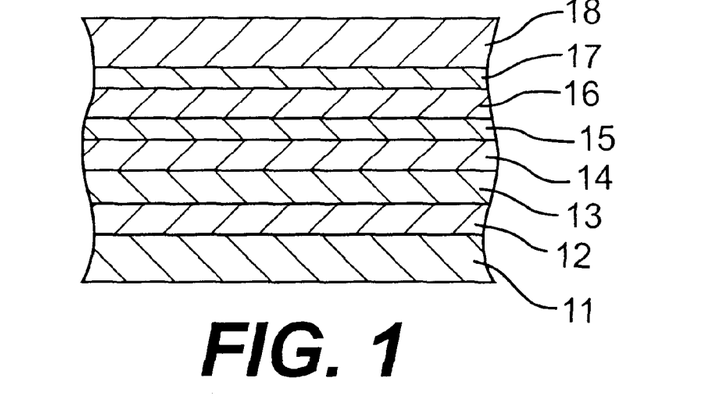
FIG. 1 is a cross-sectional view showing one embodiment of the phase change optical disc of the invention.

FIG. 1 indicates an outline of the cross section of one embodiment of the constitution of the phase change optical disc of the invention.

In FIG. 1, 11 is a polycarbonate substrate, 12 is a third layer of ZnS—SiO2, 13 is a second layer of SiO2, 14 is a first layer of ZnS—SiO2, 15 is a recording layer of GeSbTe, 16 is an upper dielectric layer of ZnS—SiO2, 17 is a reflective layer of Au, and 18 is a UV coating.

The dielectric constants of the first, second and third layers at a wavelength of 660 mn is (n, k)=(2.13, 0), (1.46, 0), and (2.13, 0), respectively. The thickness of each layer is as follows: Third layer of ZnS—SiO2=80 nm, second layer of SiO2=120 nm, first layer of ZnS—SiO2=60 nm, recording layer of GeSbTe=20 nm, upper dielectric layer of ZnS—SiO2=40 nm, reflective layer of Au=50 nm. The optical characteristics of the disc with that constitution are as follows: Reflectance of the amorphous area, Ra=0.17; Rc=0.002; Ac/Aa=1.21; contrast, (Ra−Rc)/Ra=0.986. Therefore, the disc is a type of L-to-H medium, and its contrast is enough for good signal-to-noise ratio. Satisfying the state of Ac/Aa, this is a phase change optical disc that may be troubled little by cross-erasure and mark jitters.

The phase change optical disc having the layer constitution indicated above was fabricated herein according to the process mentioned below. The disc thus fabricated was really a type of L-to-H medium, and it does not require initialization process.

Precisely, the layers except the recording layer of GeSbTe were formed through ordinary sputtering Ar gas. The recording layer was formed with a process with Kr-Xe mixed gas at 6.7 Pa having a Kr content of 20% while RF power of 50 W was applied to the sputtering target for the layer. In that manner, the disc was fabricated.

In the process, fabricated was the L-to-H disc not requiring initialization process, for which the reasons are as follows:

The sputtering gas used in forming the recording layer was the Kr-Xe mixed gas, and the sputtered GeSbTe particles readily lost their energy in the vapor phase. In addition, since the sputtering gas pressure was high, the sputtered GeSbTe particles were acceleratedly cooled in the vapor phase. Moreover, since the power applied to the sputtering source was relatively low, the energy of the particles just after sputtered from the source was low. Therefore, the energy of the particles irradiated to the substrate was low, and the time for which the particles being in a liquid phase were solidified to be in a solid phase on the substrate was long, or that is, the rate of cooling the sputtered particles on the substrate was low. Accordingly, the rate of cooling the sputtered GeSbTe particles on the substrate in the sputtering process herein was lower than a rate of $10^{12}$ K/sec as in ordinary sputtering, or that is, the cooling rate herein was lowered to the order of $10^{10}$ K/sec as in optical recording operation. For these reasons, the amorphous state of the recording layer just after its formation could be similar to the amorphous state of the layer having been optically recorded thereon.

For making the amorphous state of the recording layer just after its formation similar to the amorphous state of the layer to be formed in optical recording operation, it is not always necessary to attain all the requirements of selecting the sputtering gas materials suitable for the material of the recording layer to be formed, increasing the sputtering gas pressure, decreasing the sputtering power, and applying bias power to the substrate. Any of these requirements may be chosen and combined in any desired manner.

Apart from the means employed herein, any other means are also employable. One is to promote the migration of the sputtered particles on the substrate being layered, for example, by heating the substrate at around several tens ° C., or by exposing the substrate to an ionic shower from an additional ion source; and the other is to lower the energy of the particles having sputtered toward the substrate, for example, by ionizing the particles having sputtered from the surface of the target and passing them through a decelerated electric field, or by prolonging the distance between the target and the substrate, or by decentering the substrate relative to the target so that only the particles having sputtered from the target in the oblique direction could reach the substrate to form a film thereon. These means may be combined in any desired manner, whereby the amorphous state of the recording layer just after its formation through sputtering process could be made similar to the amorphous state of the layer to be formed in optical recording operation.

In those embodiments illustrated herein, the recording layer is formed through sputtering process which is the most practicable in the art but is not limitative. Apart from such sputtering process, any other film-forming means of vapor deposition, vapor deposition in a high pressure gas, MBE, plasma CVD, MOCVD or the like is also employable herein.

In this Example, initial crystallization process may be omitted in fabricating the disc. Therefore, according to the process of this Example, discs can be provided at low production costs.

After recorded, the disc of this Example was compared with a comparative disc also recorded, through TEM (transmission electron microscope) observation for checking the recorded state of the discs. For the TEM observation, small test pieces were cut out from the recorded area of each disc, the covering support was removed along with the UV adhesive layer, then the substrate was dissolved away. Only the films constituting the disc were scooped up on a sieve, and the reflective layer of Au was removed by ion milling. As a result, the test piece gave a pattern like that shown in FIG. 2 after the initial recording operation. After 100 times OW (overwriting), this gave a pattern like that shown in FIG. 3.

Figure 2:
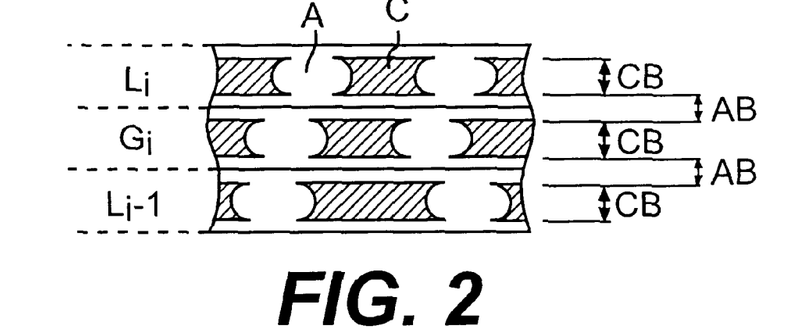
FIG. 2 is a schematic view showing the area around the record marks in the phase change optical disc of the invention.
Figure 3:
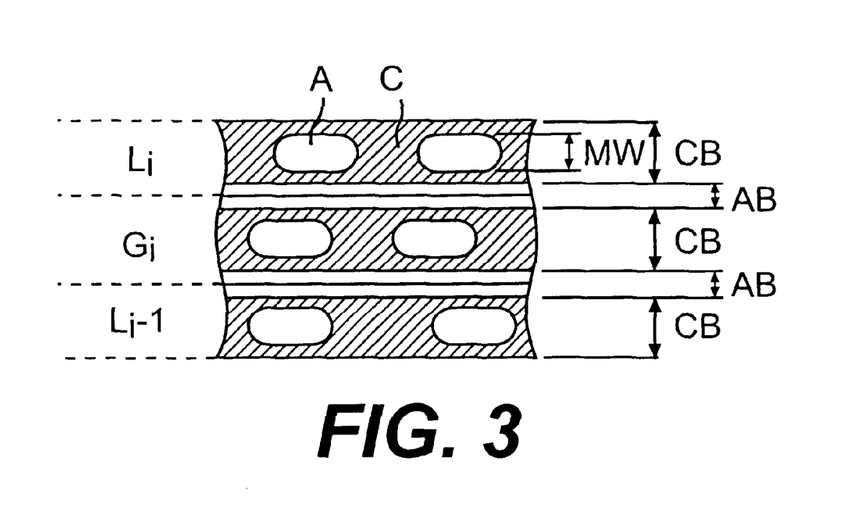
FIG. 3 is a schematic view showing the area around the record marks in the phase change optical disc of the invention

In FIG. 2 and FIG. 3, Li-1 and Li indicate i-1'th and i'th land tracks, respectively; Gi indicates an i'th groove track; A indicates an amorphous record mark area; C indicates a crystal area between adjacent amorphous record marks; CB indicates the width of a crystal band; AB indicates the width of an amorphous band between adjacent crystal bands; and MW indicates the width of an amorphous record mark area. In FIG. 2, MW is the same as CB, though not shown. In TEM observation of the conventional phase change optical disc tested herein for comparison, the area of amorphous bands to be seen as in FIG. 2 and FIG. 3 were found crystallized.

The discs prepared herein were further tested for recording random data thereon at a high recording rate of 12 m/sec, and the record patterns formed on these discs were observed. After the OW test, the record pattern formed on the disc of this Example was still similar to the pattern shown in FIG. 2.

The test results obtained herein are discussed. Specifically, during recording operation, the area to be the amorphous record marks is melted, and the area around it has a temperature at which the area is crystallized. When the linear velocity for recording is low or when OW is repeated many times, the total time for which that area is kept at the temperature at which it is crystallized is long, thereby resulting in that a crystalline area is formed around the area of the amorphous marks. Accordingly, in the disc of this Example, the pattern as shown in FIG. 3 is formed more readily when the linear velocity for recording is lower or when OW is repeated more. On the contrary, when the linear velocity for recording is higher or when OW is not repeated so much, the pattern to be formed in the disc is to be similar to that shown in FIG. 2.

Since the disc of this Example was fabricated according to the process as above, it was not subjected to initial crystallization process. Therefore, the recording layer in the address region in the disc was kept amorphous. As a result, the address region had high reflectance, and the S/N ratio in the disc was high.

EXAMPLE 2

Two different types of phase change optical discs, Sample 1 and Sample 2 were fabricated according to the same process as in Example 1, in which, however, the thicknesses of the first, second and third layers were varied. As in FIG. 1, the two samples have the third layer 3 to the reflective layer 17 with their thicknesses being 70/90/80/20/50/60 (nm) (Sample 1) and 70/130/60/20/40/40 (nm) (Sample2) in that order. The two have Ra, Rc, contrast, and Ac/Aa of 0, 0.15, 1.0 and 1.2, respectively. The two samples are both of a type of L-to-H medium, and have the same optical characteristics. Their contrast is enough for good SIN ratio. Satisfying the state of Ac/Aa>1, these are phase change optical discs that may be troubled little by cross-erasure and mark jitters.

The thermal conductivity of the SiO2 layer is larger than that of the ZnS—SiO2 layer. As in *Japanese Journal of Applied Physics*, Vol. 28 (1989), Supplement 28-3, pp. 123–128, the thermal conductivity of ZnS—SiO2 is 0.58 W/m/K, while that of SiO2 is 1.4 W/m/K in bulk state. Even though the reduction in the thermal conductivity of SiO2 in the form of thin films is taken into consideration, it is deduced that the thermal conductivity of the Sio2 layer will be a few times larger than that of the ZnS—SiO2 layer. As compared with Sample 1, Sample 2 has the larger distance between the SiO2 layer and the thinner recording layer and the thicker SiO2 layer. This means that in Sample 2, the heat flow from the recording layer to the SiO2 layer is larger than in Sample 1. In other words, Sample 2 has a "rapidly-cooling structure" where the temperature decrease in the recording layer is large, while Sample 1 has a "gradually-cooling structure" that is contrary to the structure of Sample 2. In this Example, the two different types of discs produced have quite the same optical characteristics but have different thermal characteristics.

In conventional techniques, it was difficult to independently control the optical characteristics and the thermal characteristics of optical recording medium. However, according to the process of this Example where a three-layered interference layer of first, second and third layers of which the dielectric constant differs from that of the adjacent layers is disposed in L-to-H medium, it is possible to independently control the optical characteristics and the thermal characteristics of the medium. This means that the margin for layer stack in fabricating optical recording medium is broadened according to the technique of the invention.

EXAMPLE 3

Herein fabricated were different types of optical recording discs where the first and third layer were of ZnS—SiO2, but the refractive index, n, of the second layer was varied by the material. Their optical characteristics were measured. Based on the data, the discs of a type of L-to-H medium having a high contrast and satisfying the state of Ac/Aa>1.2 were picked up. As a result, it was found that the disc of FIG. 1 where the thicknesses of the third layer 13 the reflective layer 17 were 80/100/70/20/50/80 (nm) in that order and where the refractive index, n, of the second layer was 1.56 had Ra, Rc, contrast, and Ac/Aa of 0, 0.14, 1.0 and 1.2, respectively. With n larger than 1.56, there was found no solution capable of satisfying the state of Ac/Aa>1.2. On the other hand, when n is smaller than 1.56, the latitude in the medium structure that satisfies the optical state noted above is broadened more and Ac/Aa and also the contrast of the medium are increased more, with the reduction in n.

The increase in the latitude in the medium structure where the second layer has a smaller value of means the easiness in thermal design for fabricating the medium. For example, when n=1.5, the following results could be obtained. When the thicknesses of the third layer 12 the reflective layer 17 in FIG. 1 are 100/90/70/20/50/80 (nm) in that order, Ra, Rc, contrast, and Ac/Aa are 0, 0.15, 1.0 and 1.2, respectively; when they are 90/100/70/20/90/40 (nm), Ra, Rc, contrast, and Ac/Aa are 0.05, 0.25, 0.8 and 1.4, respectively; when they are 70/130/60/20/50/100 (nm), Ra, Rc, contrast, and Ac/Aa are 0.002, 0.172, 0.99 and 1.2, respectively; and when they are 80/130/70/20/90/40 (nm), Ra, Rc, contrast, and Ac/Aa are 0.05, 0.25, 0.8 and 1.4, respectively.

Of the results noted above, the former two are for the structure in which the cooling rate of the recording layer is small, and the latter two are for the structure in which the cooling rate of the recording layer is large. According to the process of this Example, discs having the necessary optical characteristics and having different thermal characteristics can be realized. In addition, it has been found that in this Example, the two different types of thermal characteristics can be realized with extremely large Ac/Aa value of 1.4.

EXAMPLE 4

Figure 4:
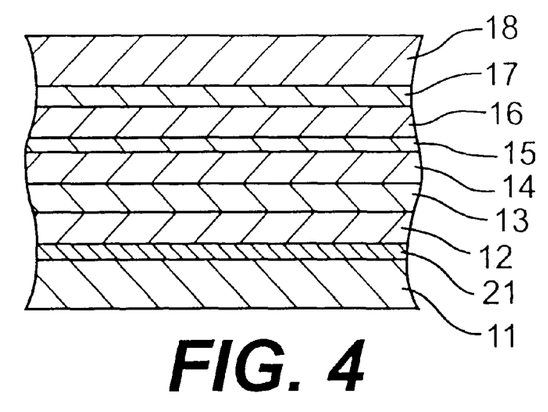
FIG. 4 is a cross-sectional view showing another embodiment of the phase change optical disc of the invention.
Figure 5:
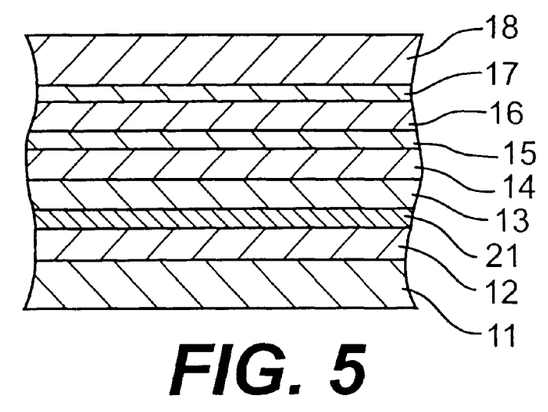
FIG. 5 is a cross-sectional view showing still another embodiment of the phase change optical disc of the invention.
Figure 6:
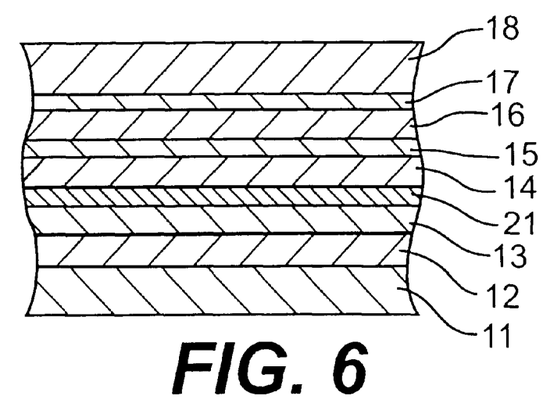
FIG. 6 is a cross-sectional view showing still another embodiment of the phase change optical disc of the invention.

Herein fabricated were phase change optical discs having different cross-sectional structures of FIG. 4, FIG. 5 and FIG. 6. In FIG. 4, FIG. 5 and FIG. 6, 21 is a metal layer of Au; 11 is a polycarbonate substrate; 12 is a third layer of ZnS—SiO2; 13 is a second layer of SiO2; 14 is a first layer of ZnS—SiO2; 15 is a recording layer of GeSbTe; 16 is an upper dielectric layer of ZnS—SiO2; 17 is a reflective layer of Au; and 18 is a uv coating.

The structures of FIG. 4, FIG. 5 and FIG. 6 were tested for their optical characteristics in relation to the thickness of each layer, and the results are as follows:

| Number | Layer Constitution (thickness; nm) |
| --- | --- |
| #1 | Au 10/ZS 80/SiO2 100/ZS 90/GST 20/ZS 90/Au 20 |
| #2 | ZS 70/Au 10/SiO2 100/ZS 60/GST 20/ZS 70/Au 10 |
| #3 | ZS 50/SiO2 10/Au 20/ZS 120/GST 20/ZS 100/Au 30 |
| #4 | ZS 90/SiO2 100/Au 10/ZS 100/GST 20/ZS 100/Au 30 |

| Number | Rc | Ra | Contrast | Ac/Aa |
| --- | --- | --- | --- | --- |
| #1 | 0.03 | 0.15 | 0.80 | 1.5 |
| #2 | 0.02 | 0.15 | 0.87 | 1.5 |
| #3 | 0.03 | 0.15 | 0.80 | 1.5 |
| #4 | 0.03 | 0.16 | 0.81 | 1.5 |

In Table above, ZS indicates a layer of ZnS—SiO2; and GST indicates a recording layer of GeSbTe. Au has a thermal conductivity of 300 W/m/K. The thermal conductivity of Au is much larger than that of SiO2. The thermal conductivity of SiO2 is a few times larger than that of ZnS—SiO2.

Accordingly, in the structures illustrated, the temperature of the recording layer can be controlled by the distance between the Au layer and the recording layer. The data in Tables above are discussed from this viewpoint. It is understood that the distance between the recording layer and the Au layer 21 is 270 nm in #1, 160 nm in #2 and 120 nm in #3, and becomes smaller in that order. Therefore, the cooling rate of the recording layer in those samples shall be higher in that order. In #4, the distance between the recording layer and the Au layer 21 is 100 nm, and is nearly the same as that in #3. In #4, however, the thickness of the second layer 13 is 100 nm and is larger than that of being 10 nm in #3. As so demonstrated in Example 2, therefore, the thermal conductivity between the recording layer and the Au layer 21 could be enlarged more in #4. Accordingly, the thermal characteristics of the discs can be significantly varied with their optical characteristics being kept nearly the same In all the structures of #1 to #4, Ac/Aa=1.5. That is, these structures all have an extremely good characteristics of Ac/Aa. In this Example, the phase change optical discs fabricated are not troubled by cross-erasure and phase jittering with appropriate thermal characteristics as the system requires. Such good optical discs could not be realized in conventional techniques.

From the results in this Example, it is understood that the optical discs where the interference layer is composed of the first, second and third layers and the metal layer, of which the dielectric constant differs from that of the adjacent layers, are advantageous in that not only their optical characteristics are improved but also the latitude in their thermal characteristics can be much broadened.

As is obvious from Tables above, the discs fabricated in this Example are a type of L-to-H medium, but other discs of a type of H-to-L medium could also produce the same results as herein.

EXAMPLE 5

Phase change optical discs having the same structures as in Example 4 were fabricated. In this, however, the refractive index of the second layer constituting the interference layer was, n=1.8, or 1.0. n=1.8 is realized, for example, by employing GeN; and n=1.0 is realized, for example, by employing CaF or MgF. The optical characteristics of the discs are shown in the following Table.

| Number | Layer Constitution (thickness; nm) | | | |
|---|---|---|---|---|
| #1 | ZS 60/Au 20/X1 90/ZS 50/GST 20/ZS 90/Au 20 | | | |
| #2 | ZS 100/X1 60/Au 10/ZS 200/GST 20/ZS 70/Au 10 | | | |
| #3 | Au 20/ZS 40/X2 100/ZS 50/GST 20/ZS 80/Au 20 | | | |
| #4 | ZS 90/X2 20/Au 10/ZS 110/GST 20/ZS 50/Au 10 | | | |
| Number | Rc | Ra | Contrast | Ac/Aa |
| #1 | 0.03 | 0.15 | 0.80 | 1.5 |
| #2 | 0.03 | 0.16 | 0.81 | 1.5 |
| #3 | 0.04 | 0.20 | 0.80 | 1.5 |
| #4 | 0.04 | 0.22 | 0.82 | 1.5 |

In Table above, X1 indicates the second layer having a refractive index, n, of 1.8; and X2 indicates the second layer with n=1.0. The others are the same as those in Example 4.

Like in Example 4, the samples are discussed from the viewpoint of the cooling rate of the recording layer therein. The material of X1 for the recording layer realized the gradually-cooling structure and the rapidly-cooling structure of #1 and #2, respectively; and the material of X2 for the recording layer realized the gradually-cooling structure and the rapidly-cooling structure of #3 and #4, respectively. In addition, the samples all had an extremely large ratio of Ac/Aa. With such good thermal design, the samples fabricated herein are advantageous in that they are troubled little by cross-erasure and phase jittering.

Some examples of the invention have been described hereinabove, which, however, are not intended to restrict the scope of the invention.

For example, in the Examples illustrated above, the first to third layers constituting the interference layer are of ZnS—SiO2 and SiO2 as combined. Apart from this combination, any other materials can be employed for the first to third layers to constitute the interference layer.

In the present invention, it is indispensable that the interference layer comprises at least three layers of which the dielectric constant differs from that of the adjacent layers, but the materials for the constituent layers, the thickness of each layer, and also the methods and the states for forming the layers except the recording layer are not specifically defined.

For example, the materials employable for the first to third layers to constitute the interference layer include various dielectric substances comprising compounds of Cr. Nb, V, Ta, Ti, W, Hf, V, In, Si and/or B with at least one selected from the group consisting of oxygen, nitrogen, carbon and hydrogen elements.

Also employable are compounds of a general formula M—G, where M indicates at least one selected from the group consisting of Si, Al, Zr, Ti, In, Sn and B; and G indicates at least one selected from the group consisting of oxygen, nitrogen and carbon elements. Concretely mentioned are Si—O, Al—O, Zr—O, Ti—O, Si—N, Al—N, Zr—N, Ti—N, B—N, Si—C, Ti—C, B—C, SiAl—ON, Si—ON, AlTi—OC, In—Sn—C, etc.

Further employable are carbon isotopes, concretely, diamond, amorphous carbon, and diamond-like carbon. For example, mentioned are dielectric film materials of Ta2O5, Si3N4, SiO2, Al2O3, AlN, etc.

Also employable are semiconductor materials such as simple substances of Si, Ge, Se, Sn, Te, etc., III–V compounds of AlSb, GaAs, InAs, InSb, etc., II–VI compounds of Cdo, Cds, ZnO, ZnS, etc., and their mixtures; as well as metal materials of Ag, Cu, Al, Cr, Nb, V, Ta, Ti, W, Hf, In, etc.

In addition, the layers may have various composite film structures comprising a matrix of a dielectric, metal or semiconductor material and fine particles dispersed therein of a dielectric, metal or semiconductor material that differs from the material for the matrix.

The refractive index, n, of the first to third layers is not defined to fall between 1.0 and 1.8 as hereinabove. n may be 2 or may be even larger than it.

In the Examples mentioned above, the refractive index of the first to third layers is large/small/large in the order of the first to third layers, which, however, is not limitative. In the invention, the dielectric constant of each layer constituting the interference layer shall differ from that of the adjacent layers. Therefore, apart from the illustrated case, any other cases of, for example, small/large/small, large/middle/large or large/small/middle are applicable to the layer constitution. As the case may be, the layers may be so laminated that only the extinction coefficient, k, of each layer differs from that of the adjacent layers.

The number of the layers constituting the interference layer is not limited to 3. Pour or more layers may be laminated to form the interference layer.

Apart from Au employed in the Examples hereinabove, other various materials of, for example, Au, Cu, Al and the like are employable for the metal layer that constitutes the interference layer.

For the recording layer, employable are various chalcogenide materials such as InSbTe, AgInSbTe, GeTeSe and others, apart from GeSbTe employed in the Examples For the reflective layer, employable are various reflective materials such as Al alloy materials that include AlMo, AlCr, AlTi and others, apart from Au employed in the Examples.

In the Examples illustrated hereinabove, optical discs have been demonstrated as one embodiment of phase change optical recording medium, which, however, are not intended to restrict the scope of the invention. Apart from those, the present invention is applicable to any other various types of optical recording medium such as optical recording cards, etc., and produces the same results as demonstrated herein.

While the invention has been described in detail and with reference to specific embodiments thereof, it will be apparent to one skilled in the art that various changes and modifications can be made therein without departing from the spirit and scope thereof.

What is claimed is:

1. A phase change optical recording medium, which comprises a substrate, a interference layer formed on the substrate and a recording layer formed on the interference layer, wherein;

the reflectance of a crystalline state in the recording layer is lower than the reflectance of an amorphous state in the recording layer, the interference layer comprise a first layer, a second layer which is below the first layer and of which the dielectric constant differs from that of the first layer, and a third layer which is below the second layer and of which the dielectric constant differs from that of the second layer, and the recording layer has a data region and an address region, and wherein the data region has plurality of tracks, and wherein after a recording and erasing operation is carried out, wherein the data region has crystal band and amorphous mark lines in the crystal band, and wherein the width of each amorphous mark line is equal to or narrower than the width of each crystal band.

2. The phase change optical recording medium as claimed in claim 1, wherein the address region in the recording layer is in the amorphous state.

3. The phase change optical recording medium as claimed in claim 1, wherein the refractive index of the second layer is smaller than that of the first layer.

4. The phase change optical recording medium as claimed in claim 1, wherein the second layer is of SiO2.

5. The phase change optical recording medium as claimed in claim 1, wherein the first and third layers are of ZnS—SiO2.

6. The phase change optical recording medium as claimed in claim 1, wherein the recording layer is of GeSbTe.

7. The phase change optical recording medium as claimed in claim 1, as amended, wherein an adjacent layer of the first to third layers differ from each other in their refractive index, n, and/or extinction coefficient, k.

8. A phase change optical recording medium, which comprises a substrate, an interference layer formed on the substrate and a recording layer formed on the interference layer, wherein;

the interference layer comprises a first layer, a second layer which is below the first layer, a third layer which is below the second layer, and a metal layer which is adjacent to at least one of the first to third layers, and the dielectric constant of the first to third layers and the metal layer differs from that of an adjacent layer.

9. The phase change optical recording medium as claimed in claim 8, wherein the reflectance of a crystalline state in the recording layer is lower than the reflectance of an amorphous state therein.

10. The phase change optical recording medium as claimed in claim 8, wherein the metal layer is of Au.

11. The phase change optical recording medium as claimed in claim 9, wherein the recording layer has a data region and an address region, and wherein the data region has plurality of tracks.

12. The phase change optical recording medium as claimed in claim 11, after a recording and erasing operation is carried out, wherein the data region has crystal bands and amorphous mark lines in the crystal band, wherein the width of each crystal band is narrower than that of each track, and wherein the width of each amorphous mark line is the same as or narrower than that of each crystal band.

13. The phase change optical recording medium as claimed in claim 11, wherein the address region in the recording layer is in the amorphous state.

14. The phase change optical recording medium as claimed in claim 8, wherein the refractive index of the second layer is smaller than that of the first layer.

15. The phase change optical recording medium as claimed in claim 8, wherein the second layer is of SiO2.

16. The phase change optical recording medium as claimed in claim 8, wherein the first and third layers are of ZnS—SiO2.

17. The phase change optical recording medium as claimed in claim 8, as amended, wherein the recording layer is of GeSbTe.

* * * * *